UNITED STATES PATENT OFFICE.

MARTIN H. SMITH, OF NEW YORK, N. Y.

SWEETENING OILS.

SPECIFICATION forming part of Letters Patent No. 562,670, dated June 23, 1896.

Application filed November 22, 1895. Serial No. 569,811. (No specimens.)

*To all whom it may concern:*

Be it known that I, MARTIN H. SMITH, of New York city, in the county and State of New York, have invented certain new and useful Improvements in Sweetening Oils, of which the following is a full, clear, and exact description.

The object of the invention is to provide certain new and useful improvements in sweetening fixed and essential oils, whereby the general nature of the oil treated is not affected to any perceptible degree.

The invention consists of phloroglucin or glucin, $C_6H_3(HO)_3$, forming a solution with the oil.

As heretofore practiced, oils were sweetened by dissolving in them by maceration, with or without the aid of heat and by the aid of acids or alcohol, the sweetening agents saccharin or dulcin, or by adding saccharin, dulcin, or sugar to an emulsion of the oils.

In order to sweeten the oil, I first dossolve phloroglucin in alcohol or other solvent, and then add the solution thus formed to the oil, whereby a clear solution of oil and phloroglucin by the aid of the alcohol is obtained. The solution thus formed may be directly used, or it may be subjected to a gentle heat to evaporate the alcohol and leave the phloroglucin dissolved in the oil. Instead of this method, I may mix the alcohol and the oil and then add the phloroglucin, and macerate the solution. The latter may be used as the finished product, or I evaporate the alcohol to obtain a solution of phloroglucin and the oil. I have found by experience that the latter method is not as effective as the one first described.

It is understood that the quantity of phloroglucin employed depends entirely on the degree of sweetness desired, the amount varying from one-half per cent. to one per cent.

The amount of alcohol or other solvent used need only be sufficient to dissolve the phloroglucin, usually about two or three parts (by weight) of alcohol to every part of phloroglucin.

Having thus described my invention, I claim as new and desire to secure by Letters Patent—

1. The solution of phloroglucin and oil, substantially as shown and described.

2. The solution of phloroglucin and a solvent therefor, in oil, substantially as shown and described.

3. The herein-described method of forming a solution of phloroglucin in oil, consisting in dissolving the phloroglucin in alcohol as a preliminary solvent, and then adding the solution to the oil, substantially as shown and described.

MARTIN H. SMITH.

Witnesses:
 THEO. G. HOSTER,
 JNO. M. RITTER.